Aug. 11, 1925.

F. E. WOLCOTT

ELECTRIC TOASTER

Filed Dec. 19, 1924

1,549,040

Inventor
Frank E. Wolcott,
By Harry R. Williams
Atty.

Patented Aug. 11, 1925.

1,549,040

UNITED STATES PATENT OFFICE.

FRANK E. WOLCOTT, OF HARTFORD, CONNECTICUT, ASSIGNOR TO FRANK E. WOLCOTT MANUFACTURING COMPANY, OF HARTFORD, CONNECTICUT, A CORPORATION OF CONNECTICUT.

ELECTRIC TOASTER.

Application filed December 19, 1924. Serial No. 756,886.

*To all whom it may concern:*

Be it known that I, FRANK E. WOLCOTT, a citizen of the United States, residing at Hartford, in the county of Hartford and State of Connecticut, have invented a new and useful Improvement in Electric Toasters, of which the following is a specification.

This invention relates to the class of electric toasters which have reversible holders whereby both sides of the food, such as slices of bread or crackers, may be turned close to the heating element.

The object of the invention is to provide a simple and cheap device of this character which is so constructed that the food holders may be readily detached from and attached to the frame in order to facilitate the insertion of the untoasted food in the holders and removal of the toasted food from the holders, which holders when applied to the frame are so connected that they may be instantly reversed for turning the opposite sides of the food toward the heating element.

In attaining this object the holders are made in the form of tongs which may be opened for the reception and removal of the food and which when closed will grasp the food and retain it against accidental displacement, and the frame is designed to permit the quick attachment and removal of the holders, and also to permit the holders to be rotated for exposing the opposite faces of the food to the heating element.

Figure 1:
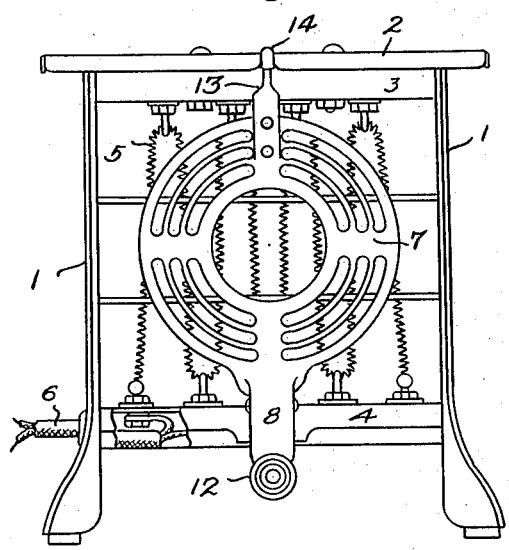
Figure 2:
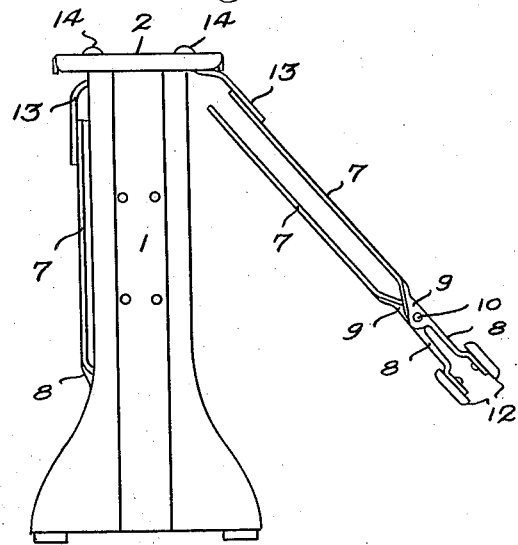
Figure 3:
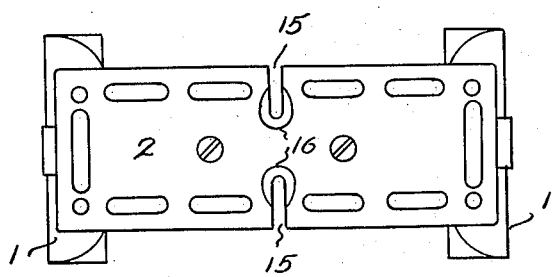
Figure 4:
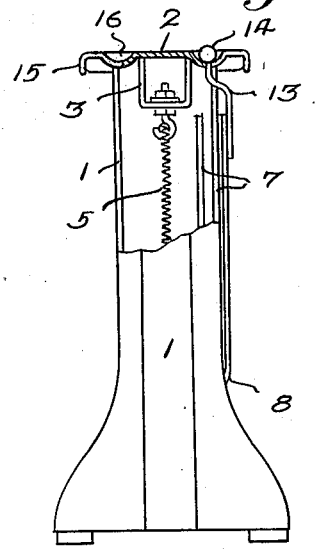
Figure 5:
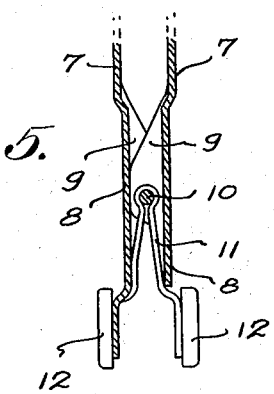

In the accompanying drawings Fig. 1 shows a front elevation of the toaster. Fig. 2 is a side elevation with one of the food holders swung outward as when it is to be reversed. Fig. 3 shows a top view of the frame. Fig. 4 is a side view with a portion of the frame broken away and only one food holder applied. Fig. 5 is a detail section of the lower end of one of the food holders.

The frame is made of sheet metal with sides 1 and top 2. Connecting the sides at the top is a channel-shaped cross piece 3 and connecting the sides at the bottom is a similarly shaped cross piece 4. The heating element consists of the ordinary coiled resistance wire 5 and is strung back and forth between these cross pieces, and the circuit wires 6 are connected with the resistance within the lower cross piece, as shown in Fig. 1.

Each of the holders consists of a pair of foraminated plates or grids 7 stamped from sheet metal. These grids have handle extensions 8 with inwardly bent flanges 9 that are pivoted together by a pin 10 which passes through these bent portions, as seen in Fig. 5. A spring 11 is bent around the pivot pin and has its ends extending out so as to tend to force the handle sections of the holder away from each other and consequently cause the grid sections to close toward each other. At the ends of the handle sections of the holder are finger buttons 12. By pressing the finger buttons together the grids are opened so as to permit the easy insertion between them of a slice of bread, a cracker or other food which is to be toasted. Upon releasing the pressure on the finger buttons the spring causes the grids to close together and hold the food.

Attached to one of the grids diametrically opposite the handle is a finger 13 which has a globular head 14. The top plate of the frame at the middle has notches 15 that extend from the edges inward to depressions 16. The notches are of substantially the width of the neck but narrower than the head of the finger, so that the finger of a holder may be slipped therein and the depressions are of such a size that they will receive the round finger head and support the holder.

When it is desired to toast a slice of bread a holder is removed, the finger buttons pressed together, the bread placed between the grids and then the holder is hung upon the frame by passing the neck of the finger into a slot and allowing the globular head of the finger to rest in the depression at the inner end of the slot. When supported in this manner the holder with the slice hangs in front of the heating element with the inner surface of the food quite close to the heating element, as shown in Fig. 1. After one side of the slice of bread or other article of food has been toasted the lower end of the holder may be swung out, as shown in Fig. 2, and the holder rotated one half way around, then allowed to swing back to a vertical position, this brings the other surface of the food opposite the heating element.

With this structure it is a very simple matter to place a slice of bread in a holder and to hang the holder on the frame, and then after one side is toasted reverse the holder so as to bring the other side close to the heating element. When the toasting is completed the holder is lifted off from the frame and the toasted piece passed to the desired locality in the holder and deposited by opening the holder without having been touched with the hands. Furthermore having the removable holders it is a very simple matter to clean the device as the holders may be taken off and polished, leaving the frame exposed so that it can be readily wiped.

The invention claimed is:—

1. A toaster comprising a frame supporting an electrical resistance and means for the attachment of circuit wires, and openable tongs connected with but detachable from the frame.

2. A toaster comprising a frame supporting an electrical resistance and means for the attachment of circuit wires, and openable tongs rotatably connected with but detachable from the frame.

3. A toaster comprising a frame supporting an electrical resistance and means for the attachment of circuit wires, and a pair of pivoted spring closed grids rotatably connected with and detachable from the frame.

4. A toaster comprising a frame supporting an electrical resistance and means for the attachment of circuit wires, said frame having slots in the edge of its top, and a food holder having a headed finger adapted to slip into and out of said slots, the head of said finger being larger than the width of the slots.

5. A toaster comprising a frame supporting an electrical resistance and means for the attachment of circuit wires, said frame having a slot in the edge of its top and a depression at the inner end of the slot, and a food holder having a finger with a globular head, said finger being adapted to slip into the slot and the head to rest in the depression, whereby the holder may be rotatably hung on the frame by said head.

6. An electrical toaster comprising a frame supporting a heating element, openable tongs, and means for hanging said tongs on the frame facing the heating element, said means permitting the rotation of the tongs without removing them from the frame.

FRANK E. WOLCOTT